United States Patent
Eckelmann-Wendt

(10) Patent No.: US 11,301,308 B2
(45) Date of Patent: Apr. 12, 2022

(54) METHOD FOR SYNCHRONIZED OPERATION OF MULTICORE PROCESSORS

(71) Applicant: SIEMENS MOBILITY GMBH, Munich (DE)

(72) Inventor: Uwe Eckelmann-Wendt, Wolfenbuettel (DE)

(73) Assignee: Siemens Mobility GmbH, Munich (DE)

( * ) Notice: Subject to any disclaimer, the term of this patent is extended or adjusted under 35 U.S.C. 154(b) by 171 days.

(21) Appl. No.: 16/311,970

(22) PCT Filed: Jun. 1, 2017

(86) PCT No.: PCT/EP2017/063260
§ 371 (c)(1),
(2) Date: Dec. 20, 2018

(87) PCT Pub. No.: WO2017/220305
PCT Pub. Date: Dec. 28, 2017

(65) Prior Publication Data
US 2020/0310887 A1 Oct. 1, 2020

(30) Foreign Application Priority Data
Jun. 23, 2016 (DE) ...................... 10 2016 211 286.4

(51) Int. Cl.
*G06F 9/52* (2006.01)
*G06F 15/82* (2006.01)

(52) U.S. Cl.
CPC ............... *G06F 9/52* (2013.01); *G06F 15/82* (2013.01)

(58) Field of Classification Search
CPC ........................................................ G06F 9/52
See application file for complete search history.

(56) References Cited

U.S. PATENT DOCUMENTS

| 3,810,119 A | 5/1974 | Zieve et al. |
| 9,417,935 B2 * | 8/2016 | Gounares ................ G06F 9/546 |

(Continued)

FOREIGN PATENT DOCUMENTS

| CN | 101354693 A | 1/2009 |
| CN | 102446155 A | 5/2012 |

(Continued)

OTHER PUBLICATIONS

Baleani M. et al., "Fault-Tolerant Platforms for Automotive Safety-critical applications", Proceedings of the 2003 International Conference on Compilers, Architecture and Synthesis for Embedded Systems, 2003, pp. 170-177, ISBN: 1-58113-676-5; 2003.

(Continued)

*Primary Examiner* — Michael J Metzger
(74) *Attorney, Agent, or Firm* — Laurence A. Greenberg; Werner H. Stemer; Ralph E. Locher

(57) ABSTRACT

A method synchronizes the operation of a plurality of multicore processors. A first and a second multicore processor each have a main processor core and at least one secondary processor core that is used for executing utility programs. Only the main processor cores of the various multicore processors synchronize to one another. The at least one secondary processor core is controlled by the respective main processor core in each multicore processor. The utility programs are processed by the at least one secondary processor core and outputs are generated that are made available to the respective main processor core of the same multicore processor. Outputs from the multiplicity of multicore processors are then output in sync by the respective main processor core.

15 Claims, 1 Drawing Sheet

(56) References Cited

U.S. PATENT DOCUMENTS

| | | | |
|---|---|---|---|
| 10,082,777 B2 | 9/2018 | Nishiyama et al. | |
| 2003/0061395 A1 | 3/2003 | Kingsbury et al. | |
| 2006/0225074 A1 | 10/2006 | Vaid et al. | |
| 2006/0245264 A1 | 11/2006 | Barr et al. | |
| 2007/0174837 A1* | 7/2007 | Wang | G06F 9/544 718/100 |
| 2011/0276787 A1* | 11/2011 | Koga | G06F 9/3853 712/215 |
| 2012/0191441 A1 | 7/2012 | Wu et al. | |
| 2013/0275626 A1* | 10/2013 | Kim | G06F 11/184 709/248 |
| 2014/0365754 A1* | 12/2014 | Combs | G06F 9/384 712/245 |
| 2016/0147587 A1* | 5/2016 | An | G06F 11/0742 714/37 |

FOREIGN PATENT DOCUMENTS

| | | |
|---|---|---|
| CN | 103562807 A | 2/2014 |
| CN | 104331388 A | 2/2015 |
| WO | 2011101707 A1 | 8/2011 |

OTHER PUBLICATIONS

Texas Instruments, "Multicore Programming Guide", Aug. 2012, [found on the Internet on Feb. 14, 2017] URL: http://www.ti.com/lit/an/spracb27b/sprab27b.pdf, pp. 1-53, 2012.

Anonymous: "Synchronization (computer science)—Wikipedia" Jun. 12, 2016 (Jun. 12, 2016), XP055726735 https://en.wikipedia.org/w/index.php?title=Synchronization_(computer science)&oldid=724890795 [found on the internet Sep. 1, 2020].

* cited by examiner

METHOD FOR SYNCHRONIZED OPERATION OF MULTICORE PROCESSORS

BACKGROUND OF THE INVENTION

Field of the Invention

The invention relates to a method for synchronized operation of a plurality of multicore processors. The invention further relates to a multicore processor system which is designed in such a way as to carry out the method for synchronized operation of a plurality of multicore processors.

For security-relevant applications, use is typically made of methods in which multiple processors (multiple CPUs) with hardware support execute their programs so synchronously that their generated outputs are quasi-simultaneous (within µs). Each of these output paths, via which an output takes place, is also referred to as a channel below. These outputs can be compared with each other by hardware means during output, e.g. by means of a voter module. In the case of three processors, for example, each generating separate outputs (three channels), variation of one output can be detected and this specific processor or the corresponding channel can then be excluded. In the case of two processors, for example, variations result in both processors being excluded and isolated from the peripheral equipment, since it is not possible to decide which of the two is generating the correct outputs.

Interrupts signify interruptions in a running program, e.g. in order to execute programs or tasks having higher priority. For this purpose, the running program is interrupted at a specific point and is continued again at this point after the interrupt has been processed. In the case of hardware-synchronized systems and/or processors which are synchronized with each other, and therefore e.g. temporally coordinated to a precision of <1 µs, interrupts are applied in such a way that the interrupt at each processor interrupts at exactly the same machine instruction of the program being performed. Furthermore, the inputs are distributed across the processors in such a way that the various processors always receive exactly identical input data.

In order for the outputs of the processors to be temporally proximate in this way, the runtime differences of the channels or processors (caused by the marginally different quartzes and possibly also by a different number of cycles for a machine code) must be equalized by time delays of the faster processor relative to the slower processor. In order to achieve this, for example, the entire program code can be configured such that a synchronization call is generated very frequently, thereby triggering a synchronization of each item of hardware. In other embodiments, the synchronization is triggered as a secondary effect of input/output instructions or following a specific number of memory accesses. Since access to the internal buses of the processor no longer exists in modern processors, the software usually assists the hardware synchronization unit by frequently calling a short function which provides the synchronization prompt for the hardware. An interrupt can only be applied at synchronization time points. The regular clock interrupt (e.g. every 20 ms) and other interrupts are therefore processed on all processors precisely when a synchronization call (special call for synchronization) takes place or has taken place in the program being performed.

It is however problematic that this method is not readily suitable for the operation of multicore processors instead of single-core processors, i.e. for processors with more that one processor core or processors with hyperthreading capabilities, which therefore provide a second, virtual processor core. Until now, these additional processor cores have been shut down in synchronized operation, i.e. not used in synchronized operation.

A specific difficulty is that the processor cores act completely independently of each other. The synchronization logic of the hardware cannot decide which of the processor cores is synchronizing in this case. Therefore the synchronization outputs of the various processor cores of a processor impede each other mutually. For example, an inactive processor core or a processor core which is no longer running any programs or software cannot be detected because the processor core that is still working continues to synchronize.

Consequently, only one processor core per channel has been fully utilized in hardware-synchronous systems until now. Therefore if a plurality of processor cores or further hyperthreading cores were available, this computing capacity would not be used but would be switched off if present. Until now, hardware-synchronous systems have therefore been purely single-processor core systems per channel. This disadvantageously means that only a corresponding fraction of the full capacity of multicore processors or processors with hyperthreading capabilities is used. In order to generate additional concurrent computing power, it has therefore been necessary until now to operate a plurality of hardware-synchronous systems in parallel, signifying correspondingly higher hardware overheads.

SUMMARY OF THE INVENTION

The object of the invention is therefore to develop a method which allows hardware-synchronous operation while using multicore processors, whereby the computing power of the additional processor cores does not remain unused.

The inventive method for synchronized operation of a plurality of multicore processors fundamentally comprises the following steps: a) A first multicore processor and a second multicore processor are provided, each comprising a main processor core and at least one secondary processor core that is used for executing utility programs. In a next step b), the synchronizing of the first multicore processor with the second multicore processor takes place in such a way that only the respective main processor core of the first multicore processor synchronizes with the main processor core of the second multicore processor. In a further step c), the at least one secondary processor core is controlled by the respective main processor core in each multicore processor. In a further step d), the utility programs are processed by the at least one secondary processor core and outputs are generated that are made available to the respective main processor core of the same multicore processor. In a final step e), the synchronous output of outputs from the plurality of multicore processors is realized by the respective main processor core.

The method has the advantage that the synchronization is effected solely by the main processor core of each multicore processor and the further secondary processor core or cores do not interfere with this synchronization. The respective main processor cores therefore act as synchronization masters. In this case, the secondary processor cores are merely used as slave computers, i.e. the pending utility programs are transferred to the secondary processor cores, executed and then the outputs are made available to the respective main processor core again. Utility programs in this context include applications, application software, computing programs, tasks and any type of programs that can be processed by processor cores. As a result of transferring the outputs to the main processor cores, the outputs are included in the synchronization of the main processor cores. This means that the secondary processor cores do not synchronize locally, but run autonomously to a large extent. This means that the computing power of the secondary processor cores can advantageously be fully utilized without thereby disrupting synchronization, since this task is only performed by the respective main processor core. As a result of this functional distribution of the utility programs over a plurality of processor cores and the corresponding concurrencies, a linear increase in the computing power can be achieved according to the number of processor cores. It is therefore possible to dispense with parallel additional computers, thereby allowing more economical and compact structural formats.

Input/output advantageously takes place only via the respective main processor cores. As a consequence, the secondary processor cores can only be controlled via the main processor cores. Only the main processor cores therefore "communicate" with the peripheral equipment.

The communication between the main processor core and the at least one secondary processor core preferably takes place by means of messages via a shared memory. In order to achieve this, the secondary processor cores can be operated as virtual processor cores by means of virtualization aids, wherein an operating system which allows communication between processor cores by means of message exchange can be provided on these cores. The transfer of messages in this case can take place via shared memory areas using e.g. an interlocking protocol in order to avoid access conflicts. The main processor core manages the memory distribution in this context.

The main processor core preferably transfers a clock time increment to the at least one respective secondary processor core of the corresponding multicore processor. The clock time increment is understood to be a clock which is updated at regular time steps or time intervals in this case. The secondary processor cores per main processor core are therefore provided with the same clock time increment synchronously. This may occur every 20 ms, for example. The secondary processor cores are therefore delegated to execute pending ready tasks or programs at regular intervals. These may be distributed over the secondary processor cores in a specific manner by the main processor core, wherein said distribution takes place in an identical manner in each multicore processor.

A recurring system call is preferably implemented in the utility programs and/or operating systems. Such a system call can be a synchronization prompt, for example.

As a result of the system call in this case, a first processing phase is preferably performed in the respective at least one secondary processor core, wherein the receiving and sending of messages between the at least one secondary processor core and the respective main processor core is carried out in this first processing phase, and a second processing phase, in which the utility programs are executed in the at least one secondary processor core, is interrupted in this case. The first processing phase therefore takes place during the interruption of the second processing phase. The actual execution of the programs takes place in this second processing phase, the respective operating system of the secondary processor cores also running in this phase. The second processing phase is therefore not aware of the respective first processing phase.

In the first processing phase, the receiving and sending of messages between the at least one secondary processor core and the respective main processor core is preferably performed at a synchronous time point. The output can then be available and processed at the same time in each main processor core without generating any unwanted variations. The synchronous time point can be achieved by actively waiting for a clock time increment. This may occur every 100 ms or every 200 ms, for example.

The first processing phase can generate a delay in the reaction to a clock time increment in the at least one secondary processor core on the basis of the system calls counted within a time between two clock time increments. Runtime differences are advantageously equalized thereby and the secondary processor cores run correspondingly more synchronously.

The secondary processors are preferably used to execute utility programs whose outputs are synchronously transferred to the main processor cores after a delay time which is greater than the run time of the utility programs.

In this case, the delay time must be selected accordingly such that the outputs to be calculated are available when the delay time expires and therefore a synchronous transfer to the main processor core is possible. For example, the run times of the utility programs may be known in advance. The expiry of the delay time is actively awaited.

At least one processor core of the at least one secondary processor core can be designed as a hyperthreading core. The method can therefore also be applied to processors with hyperthreading capabilities offering virtual processor cores.

Also disclosed is a multicore processor system comprising a plurality of multicore processors, each comprising a main processor core and at least one secondary processor core that is used for executing utility programs, characterized in that said multicore processor system is designed so as to perform the method for synchronized operation of a plurality of multicore processors as per one of the embodiments described above.

Also disclosed is a computer program which, once it has been loaded into a memory means of a data processing device, enables said data processing device to carry out a method for synchronized operation of a plurality of multicore processors as per one of the embodiments described above.

Also disclosed is a computer-readable storage medium that is used to store a program which, once it has been loaded into a memory means of a data processing device, enables said data processing device to carry out a method for synchronized operation of a plurality of multicore processors as per one of the embodiments described above.

The characteristics, features and advantages of the invention as described above and the manner in which these are achieved become clearer and easier to understand in the context of the exemplary embodiments described below and explained in greater detail with reference to the drawings, in which:

DESCRIPTION OF THE INVENTION

Figure 1:
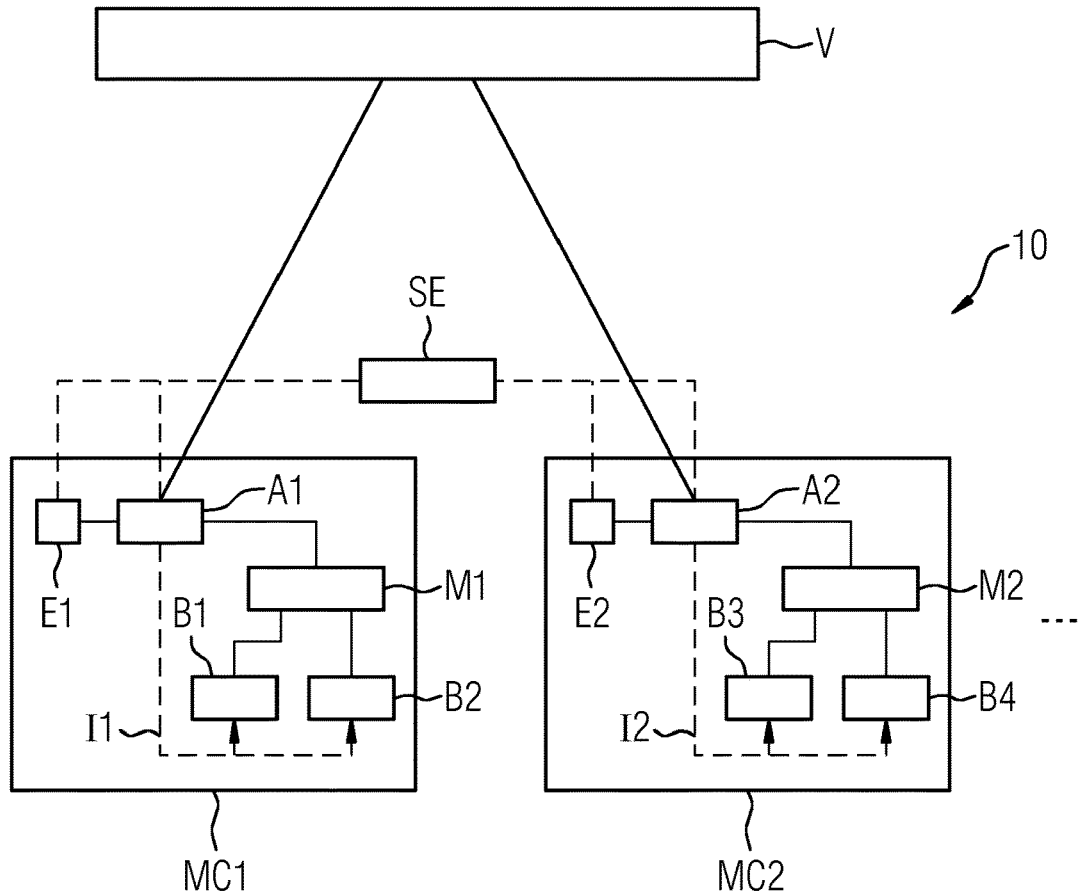
FIG. 1 shows a schematic illustration of a multicore processor system according to the invention.

By way of example only, FIG. 1 shows a schematic illustration of a multicore processor system (10) according to the invention. This illustration is also used as a basis for describing the inventive method for synchronized operation of a plurality of multicore processors (MC1, MC2), said method being schematically summarized in FIG. 2. It should be noted that only those technical features particularly relevant to the invention are shown in FIG. 1, that said features are not exhaustive but further technical features known to a person skilled in the art may also be included, e.g. further memory structures, corresponding bus systems, timers, schedulers, peripheral units, etc.

By way of example, the multicore processor system (10) comprises a first multicore processor (MC1) and a second multicore processor (MC2). Any desired number of multicore processors (MC1, MC2) may be provided, however, as long as there are at least two, which therefore corresponds to a plurality of multicore processors (MC1, MC2). A particularly preferred embodiment comprises three multicore processors, since any variation in the outputs or a failure of a multicore processor can be compensated in respect of security. Each multicore processor (MC1, MC2) comprises exactly one main processor core (A1, A2), the main processor core (A1) being installed in the first multicore processor (MC1) and the main processor core (A2) being installed in the second multicore processor (MC2) by way of example here. Furthermore, two secondary processor cores (B1, B2) for executing utility programs are available to the first multicore processor (MC1). Furthermore, two secondary processor cores (B3, B4) for executing utility programs are likewise available to the second multicore processor (MC2). However, the invention is not limited to two secondary processor cores (B1, B2, B3, B4) and instead only one secondary processor core or more than two secondary processor cores may be provided per main processor core. Utility programs in this context include applications, application software, computing programs, tasks and any type of programs that can be processed by processor cores. The utility programs that are processed by the respective multicore processors (MC1, MC2) are identical in this case, i.e. they consist of the same sequence of machine instructions.

The main processor cores (A1, A2) of the various multicore processors (MC1, MC2) are synchronized with each other, this being schematically represented in FIG. 1 by a synchronization unit (SE). Such a synchronization between the main processor cores (A1, A2) can take place as a result of e.g. synchronization calls, i.e. particular calls in the programs, or as a result of specific accesses such as e.g. memory accesses by the hardware. The outputs of the main processor cores (A1, A2) are preferably synchronized in such a way that their outputs occur within µs as and can be compared during output, e.g. by a voter module (V) as illustrated.

The secondary processor cores (B1, B2, B3, B4) are not included in this synchronization, but run essentially autonomously. Therefore only the respective main processor cores (A1, A2) of the various multicore processors (MC1, MC2) synchronize with one another. The secondary processor cores (B1, B2, B3, B4) are used to execute the utility programs and are activated by the respective main processor core (A1, A2). The control, i.e. including the distribution of the programs, subprograms or tasks over the respective secondary processor cores (B1, B2, B3, B4) takes place in the same way in each multicore processor (MC1, MC2), i.e. the same procedure operates in each multicore processor (MC1, MC2).

As part of the processing of the utility programs by the at least one secondary processor core (B1, B2, B3, B4), outputs are generated that are made available to the respective main processor core (A1, A2) of the same multicore processor (MC1, MC2). A synchronous output of outputs from the plurality of multicore processors (MC1, MC2) is therefore effected by the respective main processor core (A1, A2).

This means that the main processor core (A1, A2) functions as a synchronization master while the secondary processor cores (B1, B2, B3, B4) act as slave computers. This has the advantage that the further secondary processor cores (B1, B2, B3, B4) do not interfere with this synchronization since they do not take part in the synchronization. This means that the computing power of the secondary processor cores (B1, B2, B3, B4) can advantageously be fully utilized without thereby disrupting synchronization, since this task is only performed by the respective main processor core (A1, A2). As a result of the functional distribution of the utility programs over a plurality of processor cores and the corresponding concurrencies (parallel processing), a linear increase in the computing power can be achieved according to the number of processor cores.

Input/output takes place via an input/output unit (E1, E2), wherein only respective main processor cores have corresponding input/output units (E1, E2). Input/output is likewise included in the synchronization of the main processor cores (A1, A2). The respective secondary processor cores (B1, B2, B3, B4) do not have input/output units. This also means that the secondary processor cores (B1, B2, B3, B4) are isolated from interrupts of the input/output units (E1, E2).

The communication between the main processor core (A1, A2) and the at least one secondary processor core (B1, B2, B3, B4) is realized by means of messages via a shared memory (M1, M2). In order to achieve this, the secondary processor cores (B1, B2, B3, B4) can be operated as virtual processor cores by means of virtualization aids. An operating system which allows communication between processor cores by means of message exchange with the respective main processor core (A1, A2) can then be provided on these processor cores. The transfer of the messages can take place via the shared memory areas (M1, M2) by means of interlocking protocols in order to avoid access conflicts to the shared memory (M1, M2). The main processor core (A1, A2) manages the memory distribution in this context.

The main processor core (A1) of the first multicore processor (MC1) routes its clock time increment (I1) to the two secondary processor cores (B1, B2). The main processor core (A2) of the second multicore processor (MC2) likewise routes its clock time increment (I2) to the corresponding two secondary processor cores (B3, B4). The clock time increments (I1, I2) can occur every 20 ms, for example, and are synchronized with each other. Using the clock time increments (I1, I2), programs or tasks which are essentially ready can be made available for interim processing, said programs or tasks being sorted in a queue according to e.g. priorities or other criteria. This corresponds to a preemptive multitasking system with a priority-controlled methodology. The processing of the clock time increments is described in greater detail in the following sections.

Incorporated in the utility programs are special calls called system calls. These system calls are functions of the operating system. Using clock time increments of 20 ms, for example, these system calls may occur every ms, for example, ideally therefore always considerably less than 20 ms, and therefore frequently in relation to the clock time increments. The system calls may be synchronization prompts, for example, but are not used for the purpose of synchronization. When such a system call occurs, a first processing phase is started in the respective secondary processor core (B1, B2, B3, B4).

In this first processing phase, the cyclical routine is managed in the respective secondary processor cores (B1, B2, B3, B4). In this case, the incoming messages and outgoing messages are managed by waiting lists and are transferred between secondary processor cores (B1, B2, B3, B4) and main processor cores (A1, A2) at specific synchronous time points by means of access to the shared memory area (M1, M2). This may occur at synchronous time points every 100 ms or every 200 ms, for example. The synchronous time point can be achieved by actively waiting for a clock time increment (I1, I2). In the first processing phase, a check is also made to see whether a corresponding clock time increment (I1, I2) is pending or the next clock time increment (I1, I2) is actively awaited for approximate synchronization of the secondary processor cores (B1, B2, B3, B4) in order to equalize slight runtime differences such that e.g. a task exchange can take place. Programs which become ready upon expiry of a timer displace programs having lower priority in this case, and when all programs have been executed the idle task takes over and runs until the next clock time increment (e.g. every 20 ms), such that preemptive multitasking is propagated. If no clock time increment (I1, I2) is pending, the first processing phase updates a time counter (e.g. ms time counter) if provided, said time counter being primarily responsible for identifying time differences, and jumps back to the call point.

The processing of the utility programs in this case is part of the second processing phase, the actual computing phase of the secondary processor cores (B1, B2, B3, B4). The operating system of the secondary processor cores also runs in this second processing phase. The second processing phase (the pure execution phase) is independent of the first processing phase, i.e. it is not aware of the routines of the first processing phase.

The first processing phase also detects the number of system calls that take place between two clock time increments (I1, I2), e.g. every 20 ms. These system calls in the secondary processor cores (B1, B2, B3, B4) will typically take place at times of ms. On the basis of the number of system calls detected, a delay in the reaction to the detected clock interrupt (I1, I2) is performed. This delay is intended to result in synchronicity of the processing by the respective secondary processor cores (B1, B2, B3, B4), thereby equalizing slight variations caused by runtime differences. This variation is detected by the first processing phase by simply counting the system calls and is equalized by means of a suitable delay. The synchronization possibilities of the secondary processor cores (B1, B2, B3, B4) of the various multicore processors (MC1, MC2) are therefore in the region of the selected clock time increment intervals or clock increment intervals, e.g. 20 ms. This time window is therefore defined more widely than the time window for the corresponding main processor cores (A1, A2) to be synchronized with each other, which should typically lie in the μs region. This is therefore a more approximate synchronization than that of the main processor cores (A1, A2). Alternatively, an approximate synchronization can be effected using a clock cycle, e.g. every 20 ms, and synchronizing approximately e.g. every 200 ms by actively waiting, as described for the transfer of the inputs and outputs between secondary processor cores (B1, B2, B3, B4) and main processor core (A1, A2). It should be generally noted in this case that the processes running in the secondary processor cores (B1, B2, B3, B4) in the second processing phase, i.e. the working phase, typically only vary from each other in the range of tenths of one percent.

The exchange of the accumulated messages, which takes place in the first processing phase, between the secondary processor cores (B1, B2, B3, B4) and their respectively assigned main processor cores (A1, A2) need not take place after every clock time increment (I1, I2), but can also take place at longer time intervals, e.g. every 100 ms, since for many applications that process a time concept in order to control or track movements, for example, only cycles of at least the longer time interval are used, e.g. 100 ms, 200 ms or even 500 ms.

The scope of the invention includes secondary processor cores (B1, B2, B3, B4) which can also be designed as hyperthreading cores. Therefore the method can essentially be performed on processors with hyperthreading capabilities likewise.

Alternatively, in the case of utility programs which are executed in the secondary processors (B1, B2, B3, B4) and have a known run time, for example, for which neither an operating system for multitasking nor a clock time increment (I1, I2) is required, a delay time can be implemented which is greater than the run time of the utility program, and the calculated outputs synchronously transferred to the main processor cores (A1, A2) after the expiry of said delay time. In this case, the delay time should be selected such that the outputs to be calculated are available in the various secondary processor cores (B1, B2, B3, B4) after expiry of the delay time, such that a synchronous transfer to the respective main processor core (A1, A2) is possible despite possible runtime differences. The expiry of the delay time is actively awaited.

Operation of the method using only one multicore processor is essentially also possible and therefore included in the scope of the invention, e.g. in order to support development runs and test runs in a simplified manner. The synchronization with further channels is then omitted accordingly since these are not present.

In order to ensure that no dormant error, which could arise similarly but undetected in another channel, is resident in the memory area of the secondary processor cores (B1, B2, B3, B4), a hash value for the memory in use can advantageously be generated continuously in the secondary processor cores (B1, B2, B3, B4) likewise, and transferred to the associated main processor core (A1, A2) for comparison.

The same or different operating systems can run on the respective main processor core (A1, A2) and the respective secondary processor cores (B1, B2, B3, B4), said operating systems being separated from each other at all times. This makes it possible to load the utility programs for the secondary processor cores (B1, B2) as individual additional images. This reduces complexity in the case of updates and maintenance.

The respective main processor core (A1, A2) does not normally have to support any project-specific applications or utility programs, since the computing power for the specific utility programs is provided by the secondary processor cores (B1, B2, B3, B4) alone. As a consequence, the respective main processor core (A1, A2) can apply itself solely to the communication load, thereby potentially increasing the number of possible usable channels for the security protocols running on the main processor core (A1, A2). It is however also included in the scope of the invention that programs can also readily be processed on the respective main processor cores (A1, A2) according to workload.

In order that diagnostic software can still be operated without conflicts using a diagnostic interface, it is also advantageous for the diagnostic interface accesses of the secondary processor cores (B1, B2, B3, B4) to be routed via the main processor core (A1, A2) or for the hardware to allow separate accesses per FPGA (field programmable gate array). This means that each processor core would have its own diagnostic interface even though only one physical diagnostic interface access exists.

Figure 2:
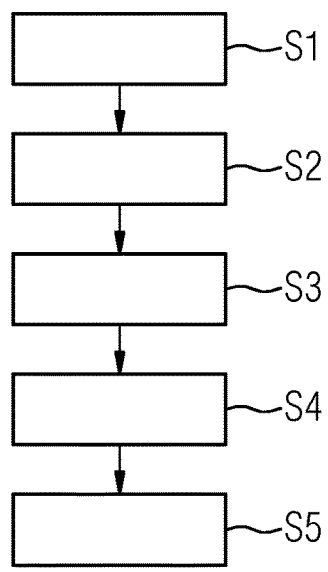
FIG. 2 shows a schematic illustration of the method according to the invention for synchronized operation of a plurality of multicore processors.

FIG. 2 schematically summarizes the method according to the invention for synchronized operation of a plurality of multicore processors. In a first step (S1), a plurality of multicore processors (MC1, MC2) are provided, each comprising a main processor core (A1, A2) and at least one secondary processor core (B1, B2, B3, B4) that is used for executing utility programs. In a second step (S2), the first multicore processor (MC1) is synchronized with the second multicore processor (MC2) in such a way that only the respective main processor core (A1) of the first multicore processor (MC1) is synchronized with the main processor core (A2) of the second multicore processor (MC2). In a third step (S3), the at least one secondary processor core (B1, B2, B3, B4) is controlled by the respective main processor core (A1, A2) in each multicore processor (MC1, MC2). The control of the at least one secondary processor core (B1, B2, B3, B4) is effected in the same manner in each multicore processor (MC1, MC2). In a further step (S4), the utility programs are processed by the at least one secondary processor core (B1, B2, B3, B4) and outputs are generated which are made available to the respective main processor core (A1, A2) of the same multicore processor (MC1, MC2). In a further step (S5), the outputs of the plurality of multicore processors (MC1, MC2) are output synchronously by the respective main processor core (A1, A2).

In summary, a method is proposed for synchronized operation of a plurality of multicore processors (MC1, MC2) in which synchronized outputs are generated, wherein the computing capacity of the multicore processors (MC1, MC2) to perform programs in parallel is fully utilized. In this case, a hierarchy of tasks is established between the various processor cores within a multicore processor (MC1, MC2), wherein a main processor core (A1, A2) acts as a synchronization master and the secondary processor core or secondary processor cores (B1, B2, B3, B4) are downgraded to act as slave computers, which do not interfere with the synchronization of the main processor cores (A1, A2).

This has the advantage of more efficient utilization of the computing capacity and reduced hardware overheads accordingly. Moreover, multicore processors can now also be used in security-relevant systems while fully utilizing their increased computing power.

Although the invention is illustrated and described in detail above with reference to exemplary embodiments, the invention is not restricted to the examples disclosed herein and other variations may be derived therefrom by a person skilled in the art without thereby departing from the scope of the invention.

LIST OF REFERENCE CHARACTERS

MC1, MC2 Multicore processor A1, A2 Main processor core B1, B2, B3, B4 Secondary processor core I1, I2 Clock time increment E1, E2 Input/output unit SE Synchronizing unit M1, M2 Shared memory V Voter module S1, S2, S3, S4, S5 Step

The invention claimed is:

1. A method for synchronizing operation of a plurality of multicore processors, which comprises the steps of:
configuring the plurality of multicore processors with a first multicore processor and a second multicore processor each having a main processor core and at least one secondary processor core used for executing utility programs, the main processor cores of the plurality of multicore processors being synchronized with each other by a synchronization unit;
synchronizing the first multicore processor with the second multicore processor such that only the main processor core of the first multicore processor synchronizes with the main processor core of the second multicore processor by the synchronization unit;
controlling the at least one secondary processor core by means of the main processor core in a respective one of the multicore processors;
processing the utility programs by means of the at least one secondary processor core and generating outputs which are made available to the main processor core of a same one of the multicore processors; and
synchronously outputting the outputs from the plurality of multicore processors by means of the main processor core of the multicore processors.

2. The method according to claim 1, wherein an input/output operation only takes place via the main processor core.

3. The method according to claim 1, which further comprises effecting communication between the main processor core and the at least one secondary processor core by means of messages via a shared memory.

4. The method according to claim 1, wherein the main processor core transfers clock time increments to the at least one secondary processor core in a respective multicore processor of the multicore processors.

5. The method according to claim 1, wherein a recurring system call is implemented in the utility programs or operating systems.

6. The method according to claim 5, wherein the recurring system call in the at least one secondary processor core performs a first processing phase, in which receiving and sending of messages between the at least one secondary processor core and the main processor core is carried out, and a second processing phase, in which the utility programs are executed in the least one secondary processor core, is interrupted in this case.

7. The method according to claim 6, wherein the first processing phase performs the receiving and sending of the messages between the at least one secondary processor core and the main processor core at a synchronous time point.

8. The method according to claim 6, wherein the first processing phase generates a delay in a reaction to a clock time increment in the at least one secondary processor core per the main processor core on a basis of system calls counted between two clock time increments.

9. The method according to claim 1, which further comprises executing the utility programs in the secondary processor and the outputs are synchronously transferred to the main processor core after a delay time which is greater than a run time of the utility programs.

10. The method according to claim 1, which further comprises configuring the at least one secondary processor core as a hyperthreading core.

11. The method of claim 1, wherein the main processor cores of all of the plurality of multicore processors are synchronized with each other by the same synchronization unit in the synchronizing step.

12. A multicore processor system, comprising:
a plurality of multicore processors including a first multicore processor and a second multicore processor, each of said multicore processors containing:
a main processor core; and
at least one secondary processor core used for executing utility programs;
a synchronization unit configured to synchronize the main processor cores of the plurality of multicore processors with each other;
the multicore processor system configured to perform a method for synchronizing operation of said plurality of multicore processors, the multicore processor system programmed to:
synchronize said first multicore processor with said second multicore processor such that only said main processor core of said first multicore processor synchronizes with said main processor core of said second multicore processor by the synchronization unit;
control said at least one secondary processor core by means of said main processor core in a respective one of said multicore processors;
process the utility programs by means of said at least one secondary processor core and generating outputs which are made available to said main processor core of a same one of said multicore processors; and
synchronously output the outputs from said plurality of multicore processors by means of said main processor core of said multicore processors.

13. The multicore processor system of claim 12, wherein main processor cores of all of said plurality of multicore processors are synchronized with each other by the same synchronization unit.

14. A non-transitory computer-readable storage medium storing a program having computer executable instructions, once the computer executable instructions have been loaded into a memory of a plurality of multicore processors, including a first multicore processor and a second multicore processor, each of said multicore processors containing a main processor core and at least one secondary processor core used for executing utility programs, the main processor cores of the plurality of multicore processors being synchronized with each other by a synchronization unit, the computer executable instructions carrying out a method for synchronized operation of said plurality of multicore processors, the method comprising the steps of:
synchronizing said first multicore processor with said second multicore processor such that only said main processor core of said first multicore processor synchronizes with said main processor core of said second multicore processor by the synchronization unit;
controlling said at least one secondary processor core by means of said main processor core in a respective one of said multicore processors;
processing the utility programs by means of said at least one secondary processor core and generating outputs which are made available to said main processor core of a same one of said multicore processors; and
synchronously outputting the outputs from said plurality of multicore processors by means of said main processor core of said multicore processors.

15. The A non-transitory computer-readable storage medium of claim 14, wherein the main processor cores of all of the plurality of multicore processors are synchronized with each other by the same synchronization unit in the synchronizing step.

* * * * *